United States Patent
Mayer et al.

(10) Patent No.: US 6,823,055 B1
(45) Date of Patent: Nov. 23, 2004

(54) METHOD FOR A COMMUNICATION NETWORK THAT ALLOWS INTER-NODE USER MOBILITY

(75) Inventors: Georg Mayer, Miesbach (DE); Rosa Santa, Wien (AT); Klaus Wille, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 252 days.

(21) Appl. No.: 10/089,855

(22) PCT Filed: Sep. 27, 2000

(86) PCT No.: PCT/DE00/03357

§ 371 (c)(1),
(2), (4) Date: Aug. 26, 2002

(87) PCT Pub. No.: WO01/24487

PCT Pub. Date: Apr. 5, 2001

(30) Foreign Application Priority Data

Sep. 30, 1999 (DE) .......................... 199 46 976

(51) Int. Cl.⁷ ............................. H04M 3/42; H04M 7/00
(52) U.S. Cl. ............................. 379/201.05; 379/201.12; 379/207.12; 379/221.13; 379/913
(58) Field of Search ..................... 379/201.01, 201.02, 379/201.05, 201.12, 207.02, 207.12, 221.13, 913

(56) References Cited

U.S. PATENT DOCUMENTS

| | | | | |
|---|---|---|---|---|
| 4,899,373 A | | 2/1990 | Lee et al. .............. | 379/201.05 |
| 5,390,241 A | * | 2/1995 | Bales et al. ............ | 379/201.05 |
| 5,502,757 A | * | 3/1996 | Bales et al. ............ | 455/414.1 |
| 5,541,983 A | * | 7/1996 | Rose .................... | 379/201.01 |
| 5,717,749 A | * | 2/1998 | Sneed et al. .......... | 379/221.09 |
| 5,774,539 A | * | 6/1998 | Maass et al. .......... | 379/201.05 |
| 5,825,866 A | * | 10/1998 | Fujitsuka et al. ...... | 379/246 |
| 5,850,434 A | * | 12/1998 | Ardon ................. | 379/230 |
| 5,878,124 A | * | 3/1999 | Griesmer et al. ...... | 379/357.01 |
| 6,229,885 B1 | * | 5/2001 | Buhrmann et al. ..... | 379/216.01 |

OTHER PUBLICATIONS

XP–002163378—EG 202 102 V1.2.1 (May 1999) Private Integrated Services Network (PSIN); Service profiles of mobile PISN users; General Requirements.

XP–002163329 ECMA Standardizing Information and Communications Systems—Private Integrated Services Network (PISN)—Inter–Exchange Signalling Protocol Private User Mobility (PUM)—Registration Supplementary Service.

XP–002163330 ECMA Standardizing Information and Communications System—Private Integrated Services Network (PISN) Inter–Exchange Signalling Protocol Private User Mobility (PUM) Call Handling Additional Network Features.

XP–002163328 Business Telecommunications (BTC); Private Integrated Services Network (PISN) Private User Mobility (PUM) Impact of PUM on the PISN.

* cited by examiner

Primary Examiner—Harry S. Hong
(74) Attorney, Agent, or Firm—Bell Boyd & Lloyd LLC

(57) ABSTRACT

A method for implementing inter-node user mobility in a communication network which enables a user to perform an inter-node change between terminals of the communication network while retaining individual user settings. For this purpose, after the user has registered at a terminal coupled to a first network node, user-oriented configuration data are requested by a home network node or similar of the user, identified by the user, and are subsequently transmitted to the first network node. The latter then initiates a user configuration to be set for the user via the configuration data transmitted.

15 Claims, 1 Drawing Sheet

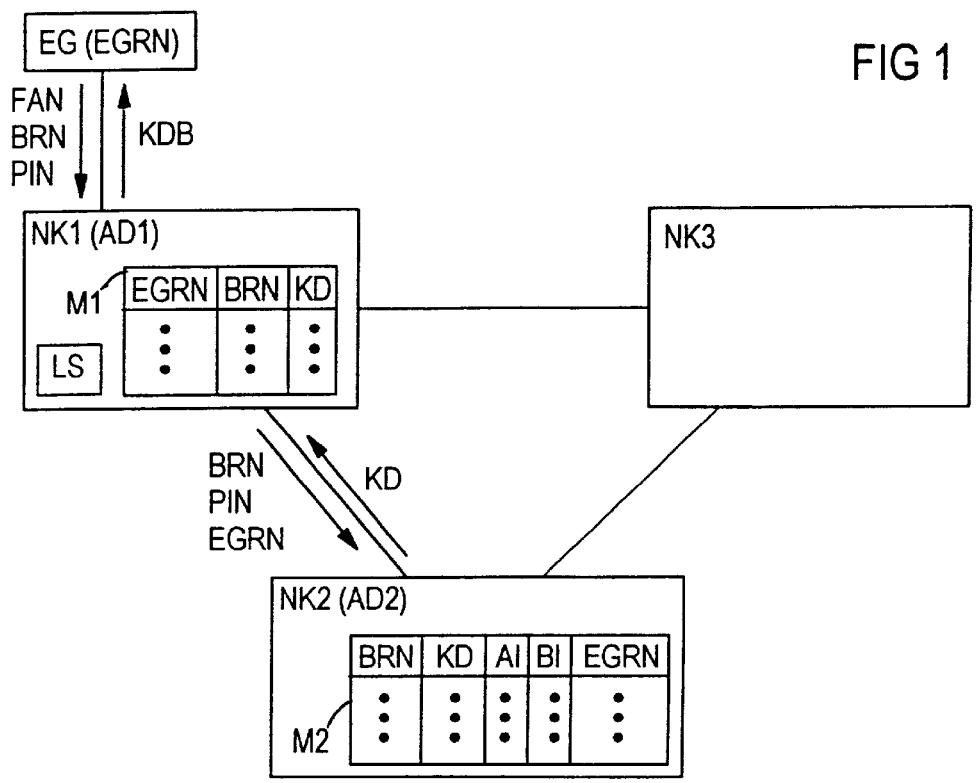
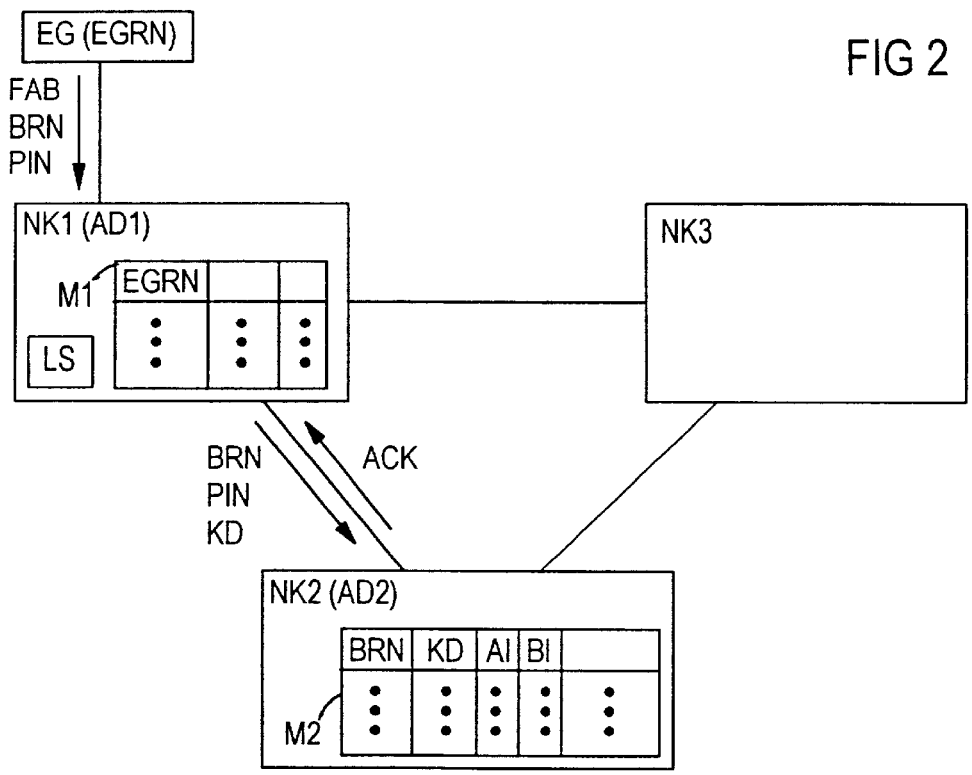

METHOD FOR A COMMUNICATION NETWORK THAT ALLOWS INTER-NODE USER MOBILITY

BACKGROUND OF THE INVENTION

In communications systems in corporate networks, it frequently happens that a terminal is temporarily allocated to different users. Contemporary communications systems allow a user call number permanently allocated to the user to be assigned to a terminal located at a new location when a user temporarily changes his/her location so that the user can be reached under his/her usual user call number even at the new location.

When a user changes to a new terminal, however, there is also a requirement that the user be provided with the greatest possible number of previous user settings such as, for example, user-oriented feature activations or settings of his/her user interface at the new terminal without having to perform these settings again. The possibility of a user to swap between different terminals while retaining user-oriented settings as far as possible is frequently called user mobility or "shared-desk" mobility.

A relevant method is known from patent specification U.S. Pat. No. 4,899,373, in which user-oriented setting data are saved for retrieval in a central database. The user-oriented setting data can be called up from a multiplicity of terminals so that when a user changes to a new terminal, the setting data allocated to the user in the database can be taken over simply from the new terminal.

In such method, however, retention of a user call number permanently allocated to the user is not provided. If necessary, this would have to be implemented in another manner which would require additional expenditure. Furthermore, the known method is not designed for adequately utilizing the advantages of contemporary communications systems based on a communication network with a multiplicity of network nodes networked together.

It is an object of the present invention, therefore, to specify a method which allows for an inter-node change of a user to another terminal in a communication network while retaining user-oriented settings.

SUMMARY OF THE INVENTION

The method according to the present invention is initiated by a user registering by inputting a registration information item at a terminal coupled to a first network node of a communication network. The registration information item can be input, for example, by operating one or more function keys, by inputting an input code provided for this purpose or in the course of a menu-controlled input procedure. After that, an identification information item identifying the user and a second network node of the communication network are read in as further user statement and transmitted to the first network node.

The further user input identifies the second network node as the network node from which user-oriented configuration data for the user are to be called up thereafter. The configuration data to be called up may include, for example setting information for a user-oriented operating interface, user-oriented feature settings and associated feature data.

The second network node can be, for example, a central server responsible for the user or a home network node of the user in which the user-oriented configuration data are, in each case, stored. The identification information to be input can be (preferably) a user call number permanently allocated to the user which identifies both the user and his/her home network node or, respectively, the responsible central server.

Using the identification information input, the first network node determines the second network node to be the network node from which the configuration data are to be called up. The first network node thereupon transmits to the second network node a user identification information item identifying the user (e.g., a user call number input), and an address information item identifying the first network node. The address information and the user identification information are saved by the second network node in order to initiate with their aid a forwarding of connection requests, subsequently arriving at the second network node for the user identified, to the first network node and from there to the terminal.

The user can thus make sure that he/she is available for external connection requests independently of the terminal at which he/she registers, in the same manner; namely, via the second network node identified via the user input.

After having received the address information and the user identification information, the second network node conveys the configuration data allocated to the user identified by the user identification information to the first network node identified by the address information. The first network node thereupon causes a user configuration, specified by the configuration data transmitted, to be set for the user.

According to one embodiment of the present invention, one or more authorization checks can be performed which influence the sequence of the method. Thus, a user authentication information item such as, for example, a so-called PIN number can be read out from the terminal which is transmitted to the second network node and checked there. Furthermore, the first and/or the second network node can check whether the user is authorized to initiate the setting of the user configuration by the first network node. Furthermore, the second network node can check whether a user is authorized at all to initiate a transmission of configuration data from the second network node to the first one. If the result of the check is negative, the method can be aborted in each case. In addition, unsuccessful registration attempts can be continuously logged and/or initiate a possibly temporary locking.

According to another embodiment of the present invention, a signaling connection preferably can be set up via the so-called QSIG signaling protocol according to ETSI Standard for transmitting data between the first network node and the second one.

According to another advantageous embodiment of the present invention, configuration data which were changed after their transmission to the first network node can be transmitted from the first network node to the second one in order to be saved there as an update of the configuration data when the user registered at the terminal signs off. In this manner, changes in the user configuration performed by the user registered at the first terminal or by a system administrator, for example, can be obtained for subsequent registrations of the user at other terminals.

The signing-off of a user can take place in different ways; for example, by the user or a system administrator inputting a signing-off information item, after the occurrence of a malfunction or automatically at a predetermined time or after a predetermined period of time has elapsed. A signing-off information item can be input, for example, by operating one or more function keys, by inputting an input code provided for this purpose or in the course of a menu-controlled input procedure. A user authentication advantageously can be performed for the signing-off.

Additional features and advantages of the present invention are described in, and will be apparent from, the following Detailed Description of the Invention and the Figures.

BRIEF DESCRIPTION OF THE FIGURES

FIG. 1 diagrammatically shows a communication network when a user registers at a terminal.

FIG. 2 diagrammatically shows the same communication network when the user signs off.

DETAILED DESCRIPTION OF THE DRAWINGS

In FIG. 1 and FIG. 2, the same communication network is in each case shown diagrammatically with three network nodes NK1, NK2 and NK3 coupled to one another, and a terminal EG coupled to the network node NK1. In this arrangement, the terminal call number EGRN is allocated to the terminal EG, the network node address AD1 is allocated to the network node NK1 and the network node address AD2 is allocated to the network node NK2, in each case as unambiguously identifying address information item. The terminal call number EGRN of the terminal EG also identifies the network node NK1 to which this terminal EG is connected.

In the network node NK1, a feature control LS and a registration memory M1 for user data of users temporarily registered at a terminal of the network node NK1 are shown as functional components.

The network node NK2 has a user memory M2 in which user data of users, for whom the network node NK2 is the home network node or responsible server, are stored. In the user memory M2 of the network node NK2, a data record with a user call number BRN permanently allocated to the user, user-oriented configuration data KD, a user-oriented authentication information item AI and user-oriented authorization information BI are stored for each user for whom the network node NK2 is the home network node or responsible server. The user call number BRN identifies both the respective user and his/her home network node or responsible server; in this case, NK2. The configuration data KD may include, for example, setting information for a user-oriented operating interface with LED settings, function key allocations, menu settings, etc., and user-oriented feature settings such as set call diversions, a short code directory, mailbox settings, etc.

FIG. 1 illustrates the sequence of the method during registration of a user, who resides at the network node NK2, at the terminal EG of the network node NK1. The user initiates his/her registration by inputting a function code FAN provided for this purpose as registration information at the terminal EG. The latter conveys the function code FAN input to the network node NK1 which thereupon initiates an interrogation of the individual user call number BRN of the user and of a so-called PIN number PIN (personal identification number) of the user. The user call number BRN input and the PIN number PIN input are subsequently transmitted to the network node NK1.

In the latter, the network node address AD2 of the home network node, in this case NK2, of the user is determined from the user call number BRN. The user call number BRN is stored, associated with the terminal call number EGRN of the terminal EG via which the registration takes place, in the registration memory M1. Using the network node address AD2 of the network node NK2 which has been found, the network node NK1 also sets up a signaling connection to the network node NK2 in accordance with the so-called QSIG signaling protocol. Subsequently, the user call number BRN, the PIN number PIN (in encrypted form if necessary) and the terminal call number EGRN are subsequently transmitted via the signaling connection set up to the network node NK2 in connection with a request of configuration data.

In consequence, the network node NK2 searches the user memory M2 for the user call number BRN transmitted and determines the record containing the user call number BRN and thus, allocated to the user. Using the authentication information AI contained in the record determined, the PIN number PIN transmitted is then checked. If the user is successfully authenticated as a result, the authorization of the user for requesting the configuration data KD via the terminal EG is then checked via the authorization information BI contained in the data record found. If the result of this check is also positive, the terminal call number EGRN transmitted is saved in the record found, associated with the user call number BRN. In addition, the user-oriented configuration data KD contained in the record found are transmitted to the network node NK1 via the signaling connection.

In the present exemplary embodiment, calls arriving for the user under the user call number BRN are first conducted by the communication network to the home network node or, respectively, to the server responsible for the user, in this case NK2. The latter thereupon determines the terminal call number EGRN allocated to the user call number BRN in the user memory. The network node NK2 subsequently takes down the partial connection set up to it during the call and initiates a setting-up of a new direct connection from the caller to the terminal EG identified by the terminal call number EGRN. This diversion of incoming connections, also called "rerouting", can be performed in a particularly simple manner with the aid of the QSIG signaling protocol. The user is, thus, also available under his/her usual user call number BRN even at the visited terminal EG.

After reception of the user-oriented configuration data KD, the latter are saved, associated with the terminal call number EGRN, in the registration memory M1 by the network node NK1. Furthermore, the configuration data KD are supplied to the feature controller LS which initiates a setting of a user-oriented feature configuration for the user, specified by the configuration data KD. If a rerouting is activated in this manner for the user, calls subsequently arriving for the user are conducted via the indirect route via the home network node NK2 to the network node NK1, according to the above statements, and are only conducted to the relevant call diversion destinations by the latter.

In addition, a part KDB of the configuration data KD is conveyed from the network node NK1 to the terminal EG where it initiates a setting of a user-oriented operating interface for the user.

FIG. 2 illustrates the sequence of the method when the user signs off at the terminal EG. In the present exemplary embodiment, the user signs off at the terminal EG by inputting a function code FAB intended for this purpose. The terminal conveys the function code FAB input to the network node NK1 which thereupon initiates a new interrogation of the individual user call number BRN and of the PIN number PIN of the user. The user call number BRN input and the PIN number PIN input are subsequently transmitted to the network node NK1.

The network node NK1 thereupon again sets up a signaling connection according to the QSIG signaling protocol to the network node NK2 via which the user call number BRN and the PIN number PIN are transmitted to the network node NK2 in the course of a user signing-off. After a successful authentication of the user via the retransmitted PIN number, the terminal call number EGRN allocated to the retransmitted user call number BRN in the user memory M2 is deleted. Thus, no further rerouting is initiated for calls arriving at the network node NK2 for the user under the user call number BRN.

Furthermore, an acknowledgement information item ACK is transmitted from the network node NK2 to the network node NK1 after the successful authentication. This causes the network node NK1 to transmit the configuration data KD, which may have been changed by the user during the registration period, back to the network node NK2. The configuration data KD transmitted back are saved by the network node NK2 in the user memory M2 instead of the configuration data previously allocated to the user. As a result, this memory is updated. Changes in the user configuration performed by the registered user are thus retained for subsequent registrations of the user at other terminals. After the reception of the acknowledgement information item ACK, the network node NK1 furthermore deletes the user call number BRN and associated configuration data KD, allocated to the terminal call number EGRN in the registration memory M1. During this process, the user settings performed for the user are cancelled again by the feature controller LS.

A user also can be advantageously signed off at a first terminal on initiation of his/her home network node, in this case NK2, if a registration request of the same user arrives at this network node NK2 from another terminal. In this case, the configuration data are first written back into the user memory M2 in the course of the signing-off, as stated above, before the user is registered at the other terminal.

Furthermore, if a fault situation is registered, such as in the case of a failure of the network node NK1 or the connection to the latter, the network node NK2 also can sign off the user without writing back configuration data. In this case, the original configuration data are retained and no further rerouting of calls arriving for the user is initiated.

In addition, a user also can be signed off on initiation of the first network node NK1 if the latter receives calls rerouted by the second network node NK2 for a user who is not or no longer registered in the first network node NK1. Such a case can occur, for example, if the registration memory M1 is cleared during a fault-related restart of the operating system of the network node NK1.

Although the present invention has been described with reference to specific embodiments, those of skill in the art will recognize that changes may be made thereto without departing from the spirit and scope of the present invention without departing from the hereafter appended claims.

What is claimed is:

1. A method for implementing inter-node user mobility in a communication network, the method comprising the steps of:
   inputting a registration information item by a user at a terminal coupled to a first network node of the communication network;
   inputting and transmitting to the first network node a user identification information item identifying the user and a second network node with stored user-oriented configuration data;
   determining the second network node by the first network node via the user identification information input;
   transmitting to the second network node the user identification information item identifying the user and an address information item identifying the first network node;
   saving the address information item by the second network node, associated with the user identified by the user identification information item transmitted, to initiate, with the aid of the address information item, a forwarding of connection requests, subsequently arriving at the second network node for the identified user, to the first network node, and from the first network node to the terminal;
   transmitting the user-oriented configuration data allocated to the identified user from the second network node to the first network node via the address information item; and
   initiating, via the first network node, a user configuration specified by the transmitted configuration data to be set for the user.

2. A method for implementing inter-node user mobility in a communication network as claimed in claim 1, the method further comprising the steps of:
   reading in a user authentication information item by the terminal;
   transmitting the user authentication information item to the second network node via the first network node;
   checking the transmitted user authentication information item by the second network node via an authentication information item stored in the second network node and allocated to the user identified by the transmitted user identification information item; and
   transmitting the configuration data to the first network node only upon a positive result of the check.

3. A method for implementing inter-node user mobility in a communication network as claimed in claim 1, the method further comprising the step of checking, by the first network node and via the user inputs, whether the user is authorized to initiate the setting of the user configuration by the first network node.

4. A method for implementing inter-node user mobility in a communication network as claimed in claim 1, the method further comprising the step of checking, by the second network node and via a respective group association of the identified user and of the terminal, whether the identified user is authorized to initiate the setting of the user configuration at the terminal.

5. A method for implementing inter-node user mobility in a communication network as claimed in claim 1, the method further comprising the step of checking, via the second network node, whether a user is authorized to initiate a transmission of the configuration data to the first network node identified by the address information.

6. A method for implementing inter-node user mobility in a communication network as claimed in claim 1, the method further comprising the step of setting up a signaling connection from the first network node to the second network node for transmitting the user identification information item, the address information item and the configuration data.

7. A method for implementing inter-node user mobility in a communication network as claimed in claim 1, the method further comprising the steps of:
   transmitting from the first network node to the second network node, upon a signing-off of the user, the configuration data which were changed after being transmitted to the first network node; and saving the transmitted changed configuration data by the second network node as an update to the user-individual configuration data.

8. A method for implementing inter-node user mobility in a communication network as claimed in claim 7, the method further comprising the step of setting up a signaling connection from the first network node to the second network node for transmitting the changed configuration data.

9. A method for implementing inter-node user mobility in a communication network as claimed in claim 6, wherein the signaling connection is set up via a QSIG signaling protocol according to an ETSI Standard.

10. A method for implementing inter-node user mobility in a communication network as claimed in claim 1, wherein a predeterminable part of the configuration data item to be transmitted is transmitted in a prioritized fashion.

11. A method for implementing inter-node user mobility in a communication network as claimed in claim 1, the method further comprising the steps of:

taking down, by the second network node, a connection set up to the second network node by a caller and directed to the user; and setting up a direct connection by the communication network from the caller to the first network node identified by the saved address information item and from the first network node to the terminal on initiation by the second network node.

12. A method for implementing inter-node user mobility in a communication network as claimed in claim 1, the method further comprising the step of rerouting, by the second network node a connection set up to the second network node by a caller and directed to the user to the first network node identified by the saved address information item, and from the first network node to the terminal.

13. A method for implementing inter-node user mobility in a communication network as claimed in claim 1, the method further comprising the steps of:

transmitting the address information item and the user identification information item from the first network node to, in addition to the second network node, other network nodes of the communication network; and saving the address information item in the other network nodes in each case associated with the user identified by the user identification information item transmitted, in order to forward, with the aid of the address information item, connection requests subsequently arriving for the identified user at one of the further network nodes in a direction of the first network node.

14. A method for implementing inter-node user mobility in a communication network as claimed in claim 1, the method further comprising the steps of:

reading in a selection information item; and transmitting the selection information item to the second network node where the configuration data to be transmitted are selected from user data in dependence on the transmitted selection information item.

15. A method for implementing inter-node user mobility in a communication network as claimed in claim 1, the method further comprising the step of transmitting a selection information item dependent on technical characteristics of at least one of the terminal and the first network node from the first network node to the second network node, the configuration data to be transmitted being selected from user data in dependence on the selection information transmitted.

* * * * *